Oct. 14, 1947.  E. L. KENT ET AL  2,429,094
APPARATUS FOR MEASURING MECHANICAL VIBRATIONS
Filed May 9, 1944
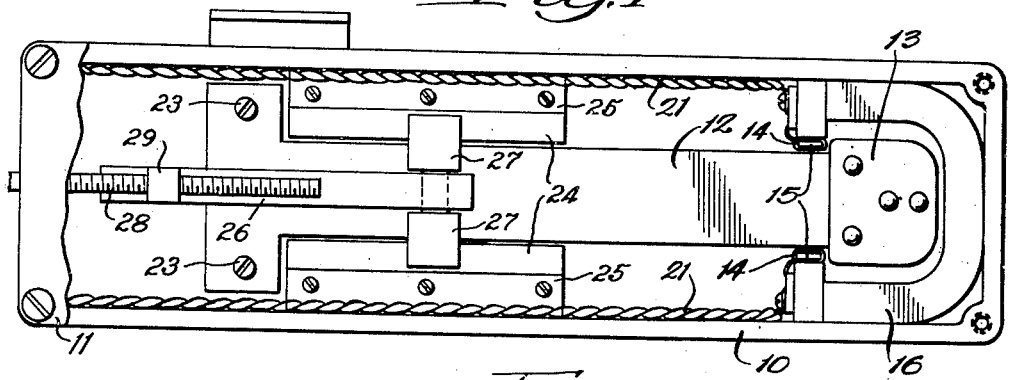
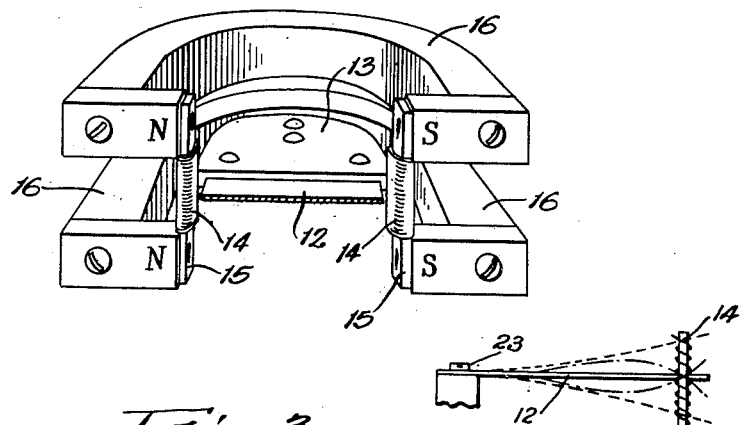
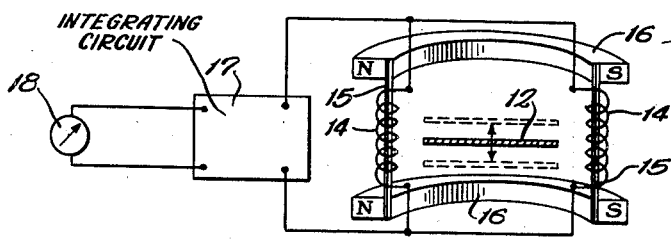
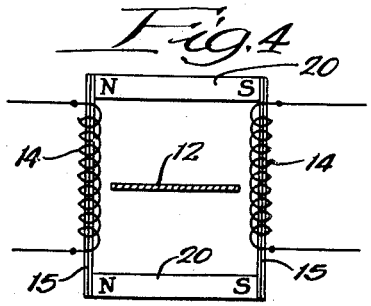
Inventors:
Robert C. Treseder and
Earle L. Kent,
Joseph W. Hazell
By Clark Koontz
Attorneys.

Patented Oct. 14, 1947

2,429,094

UNITED STATES PATENT OFFICE 2,429,094

APPARATUS FOR MEASURING MECHANICAL VIBRATIONS

Earle L. Kent, Elkhart, Ind., and Robert C. Treseder, Dayton, Ohio; said Kent assignor to C. G. Conn, Ltd., Elkhart, Ind., a corporation of Indiana Application May 9, 1944, Serial No. 534,831

5 Claims. (Cl. 177—351)

1

The invention described herein may be manufactured and used by or for the Government for governmental purposes, without the payment to us of any royalty thereon.

This invention relates to vibration apparatus and more particularly to magnetic means responsive to the vibrations of a movable member for indicating the character of the vibrations or for causing the member to vibrate.

One of the objects of the invention is to provide vibration apparatus requiring no moving parts other than the vibrating member. According to one feature of the invention both the frequency and amplitude of mechanical vibrations may be indicated or vibrations of a given frequency and amplitude may be produced.

Another object of the invention is to provide a vibration apparatus in which movement of a vibrating member is picked up or produced magnetically without interfering with freedom of movement of the member.

Still another object of the invention is to provide a vibration apparatus in which the frequency of the vibrations is indicated or induced by voltage changes in coils adjacent the vibrating member and amplitude of the vibrations is indicated by integrating the voltage changes.

A further object of the invention is to provide a vibrating apparatus in which the character of the vibrations can be indicated at a remote point. According to one feature of the invention the apparatus comprises a self-contained unit requiring no external power to transmit the indications.

The above and other objects and advantages of the invention will be more readily apparent from the following description when read in connection with the accompanying drawing, in which—

Figure 1 is a plan view of an apparatus embodying the invention with part of the cover broken away;

Figure 2 is a partial perspective with parts in section of the apparatus;

Figure 3 is a wiring diagram;

Figure 4 is a partial diagrammatic view of an alternative construction;

Figure 5 is a diagrammatic side view illustrating the modes of vibration of the reed.

The apparatus as shown in Figures 1 and 2, comprises a casing 10 adapted to be closed by a detachable cover 11 in which is mounted a flexible vibrating reed 12. The reed may be secured at one end in the casing and may be provided with tuning means for varying its resonant frequency as more particularly described and claimed in our copending application, Serial No. 534,830, filed May 9, 1944.

As shown the reed is formed at one end with T-shaped projections which are secured to spaced supports by screws 23 rigidly to mount the reed. Parallel plates 24 of the same thickness as the reed are secured at the opposite sides thereof by mounting blocks 25. A hook member 26 straddles the reed and carries at its forward ends sets of rollers 27 which engage the top and bottom surfaces of the reed and of the plates 24 so that the reed will be fixedly held in the point to which the rollers 27 are adjusted. To vary the effective length of the reed, the hook 26 may be fastened longitudinally by a screw 28 extending through the casing 10 and threaded into a lug 29 on the hook. The adjusting mechanism, as shown, is substantially like that more particularly disclosed in our copending application Serial No. 534,830, although other types of adjustment could be employed, if desired. The reed itself may, if desired, be made of a magnetic material such as steel or it may be made of a non-magnetic material and carry adjacent its free end an armature or weight which is formed of a magnetic material. In some instances where the reed is made of magnetic material, the armature or weight may be used and in this case serves primarily to weight the end of the reed. The reed, as shown, preferably carries at its free end a vane 13 which is relatively light and which serves to damp the reed slightly. The vane may be made of any desired weight to weight the reed and, if desired, may be of magnetic material to serve as the armature.

Vibrations of the reed may be picked up or induced magnetically by means of a pair of coils 14 wound on magnetic cores 15 and mounted closely adjacent the opposite sides of the reed. The coils are subjected to a substantially constant magnetic field by a pair of vertically spaced horseshoe magnets 16 mounted with their similar poles connected to the same core 15. In this way the magnetic circuit is completed from one core 15, through one side of its coil 14, through the reed or an armature carried thereby and one side of the other coil 14 to its core 15. Thus the turns of the coils are linked by the reed and the number of turns linked depends upon the position of the reed. It will be understood that, if desired, one of the magnets 16 could be omitted.

The coils are connected as shown in Figure 3 to indicating means responsive to the voltage induced in the coils by movement of the reed. As shown, the indicating means includes an integrating circuit indicated generally at 17 and which may be any desired type of circuit for integrating voltage changes in the coils. The integrating circuit is connected to a voltage indicating device 18 such as a milliammeter or voltmeter.

In operation, as the reed vibrates it changes the number of turns on the coils linked by the magnetic flux which travels across between the two pole pieces through the reed or through an armature attached thereto. This causes a voltage to be induced in the coils which is proportional to the product of the frequency and amplitude of vibration of the reed since the induced voltage is proportional to the rate of change of turns in a constant flux. This voltage is integrated by the circuit 17 which has an output voltage proportional to the amplitude of the vibration so that the meter 18 will give an indication of amplitude and may be calibrated in terms of amplitude. Frequency may be determined as more particularly explained in our copending application, Serial No. 534,830.

As shown in Figure 5 the first mode of vibration is indicated by the dotted lines and consists of a vibratory movement of the outer end of the reed between the two extreme positions shown by the dotted lines. The second mode of vibration of the reed is illustrated by the dot-dash lines as having an antinode adjacent but spaced from the free end of the reed. By placing the coil 14 opposite this antinode, it will be seen that the second mode of vibration will not affect the coil so that the coil will be sensitive only to movements of the reed according to its first mode of vibration.

In the alternative arrangement shown in Figure 4 the horseshoe magnets 16 are replaced by bar magnets 20 having their similar poles connected to opposite ends of the same core 15. Electrically this is the same as the arrangement of Figures 1 to 3 but it leaves the end of the reed more clearly visible for observation on a suitable scale.

In the normal use of the device it is desired to measure or induce only the first mode of vibration of the reed and to disregard the second and any higher modes of vibration which may be present. Since the second mode of vibration has an antinode adjacent but spaced from the free end of the reed the coils are preferably placed opposite this antinode. In this way the device is made insensitive to any except the fundamental vibrations of the reed and when used to drive the reed will produce only fundamental vibrations therein.

To use the instrument for measuring vibrations the casing 10 is placed against a vibrating member whose vibrations are to be measured and the meter 18 may be connected to the coils through the wires 21 as shown in Figure 1. It will be understood that the meter may be mounted directly on the casing or may be located at any desired remote point. Upon vibration of the reed a voltage will be induced in the coils 14 which will be indicated on the meter without the necessity of providing any external source to transmit the indications. It will be noted also that complete freedom of movement of the reed is not interfered with by this system since there are no parts which contact the reed itself.

There are two principal methods of using an instrument of this character for the measurement of mechanical vibrations in one of which the reed is tuned to resonance with the vibrations and in the other of which the resonant frequency of the reed is substantially lower than the frequency of the vibrations to be measured. In the resonant method the instrument is placed on a vibrating body and the reed is tuned to resonance with the body, as for example, by adjusting its effective length in the manner disclosed in our copending application, Serial No. 534,830. Resonance is indicated when the reed reaches its maximum amplitude of vibration and when this occurs both the frequency and amplitude of vibration to be measured are indicated as described above.

According to the second method the reed is tuned to a resonant frequency substantially below the frequency of the vibrations to be measured and the instrument is placed against the vibrating body. Since the reed is freely supported and is not resonant with the body it will remain substantially stationary in space while the body including the pickup coils moves relative to it. This will produce a relative movement between the coils and reed proportional to the amplitude and frequency of the vibrations to be measured.

To use the instrument for inducing vibrations in the reed, as for example to calibrate the reed or to determine the frequency and amplitude of an unknown electrical vibration, the coils may be connected to a source of alternating voltage. When the reed is tuned to resonance with the frequency of the applied voltage, it will vibrate at an amplitude proportional to the amplitude of the voltage and at the same frequency as the voltage. The frequency of the voltage may be determined by the adjusted resonant frequency of the reed and its amplitude may be indicated by direct observation of the reed or by utilizing a separate pickup responsive to vibrations of the reed either of the magnetic type as disclosed in this application or of the photo-electric type as more particularly described and claimed in our copending application, Serial No. 534,832, filed May 9, 1944. It will be noted that with the coils mounted at a point in the length of the reed corresponding to an antinode of a mode of frequency higher than the fundamental, the reed will be caused to vibrate only at its fundamental frequency and will be substantially insensitive to any higher modes of vibration present in the applied voltage.

While one embodiment of the invention has been shown and described in detail herein, it will be understood that this is illustrative only and is not intended as a definition of the scope of the invention, reference being had for this purpose to the appended claims.

What is claimed is:

1. Vibration apparatus comprising a member of magnetic material mounted to vibrate in response to vibrations to be measured, a pair of coils mounted on opposite sides of said member with the axes of the coils parallel to the plane of vibration of the member, and magnet means to impress a substantially constant magnetic field across the coils and the member.

2. Vibration apparatus comprising a member of magnetic material mounted to vibrate in response to vibrations to be measured, a pair of coils mounted on opposite sides of said member with the axes of the coils parallel to the plane of vibration of the member, magnet means to impress a substantially constant magnetic field across the coils and the member, an integrating circuit connected to the coils to integrate the voltage changes induced therein by vibration of the member, and indicating means connected to the integrating circuit to indicate the voltage integral.

3. Vibration apparatus comprising a flexible reed mounted adjacent one end with its other end free to vibrate, a coil mounted on each side of the reed with the axes of the coils parallel to the plane of vibration of the reed, and magnet means impressing a substantially constant magnetic field across the coils and the reed.

4. Vibration apparatus comprising a flexible reed mounted adjacent one end with its other end free to vibrate, a coil mounted on each side of the reed at a point in the length thereof corresponding to an antinode of a mode of vibration higher than the fundamental and with the axes of the coils parallel to the plane of vibration of the reed, and a magnet mounted adjacent the coils to impress a substantially constant magnetic field across the coils and reed.

5. Vibration apparatus comprising a flexible reed mounted adjacent one end with its other end free to vibrate, a coil mounted on each side of the reed with the axes of the coils parallel to the plane of vibration of the reed, cores in the coils, and a magnet having its opposite poles connected to the cores respectively.

EARLE L. KENT.
ROBERT C. TRESEDER.

REFERENCES CITED

The following references are of record in the file of this patent:

UNITED STATES PATENTS

| Number | Name | Date |
|---|---|---|
| 2,359,158 | Rushing et al. | Sept. 26, 1944 |
| 2,293,166 | Olson | Aug. 18, 1942 |
| 1,262,359 | Kropp | Apr. 9, 1918 |